United States Patent

Hendrix, Jr.

[11] 3,920,219
[45] Nov. 18, 1975

[54] APPARATUS FOR TIGHTENING BELTS
[76] Inventor: James N. Hendrix, Jr., Rte. A-3, Box 158-AE, Pearland, Tex. 77581
[22] Filed: July 2, 1974
[21] Appl. No.: 485,124

[52] U.S. Cl. ................................. 254/67; 254/100
[51] Int. Cl.² ........................................... B66F 3/08
[58] Field of Search ........ 254/54, 67, 100, DIG. 10; 248/354 S; 29/227, 256, 257

[56] References Cited
UNITED STATES PATENTS

| | | | |
|---|---|---|---|
| 2,694,946 | 11/1954 | Vandal | 248/354 S |
| 3,325,095 | 6/1967 | Mueller et al. | 254/100 |
| 3,540,698 | 11/1970 | McFarland et al. | 29/257 |
| 3,648,973 | 3/1972 | Farrell | 254/67 |
| 3,679,176 | 7/1972 | Campbell | 254/54 |
| 3,727,884 | 4/1973 | Custer | 254/67 |

Primary Examiner—Al Lawrence Smith
Assistant Examiner—Robert C. Watson
Attorney, Agent, or Firm—Carl B. Fox, Jr.

[57] ABSTRACT

Apparatus for tightening belts, wherein a telescoped element is extended and retracted by a jackscrew to extend and retract sheave-engaging elements around which the belt is disposed. The apparatus is of variable length to accommodate different sheave spacings. The apparatus may be used for other purposes, such as for example for straightening fenders.

2 Claims, 5 Drawing Figures

U.S. Patent  Nov. 18, 1975  3,920,219
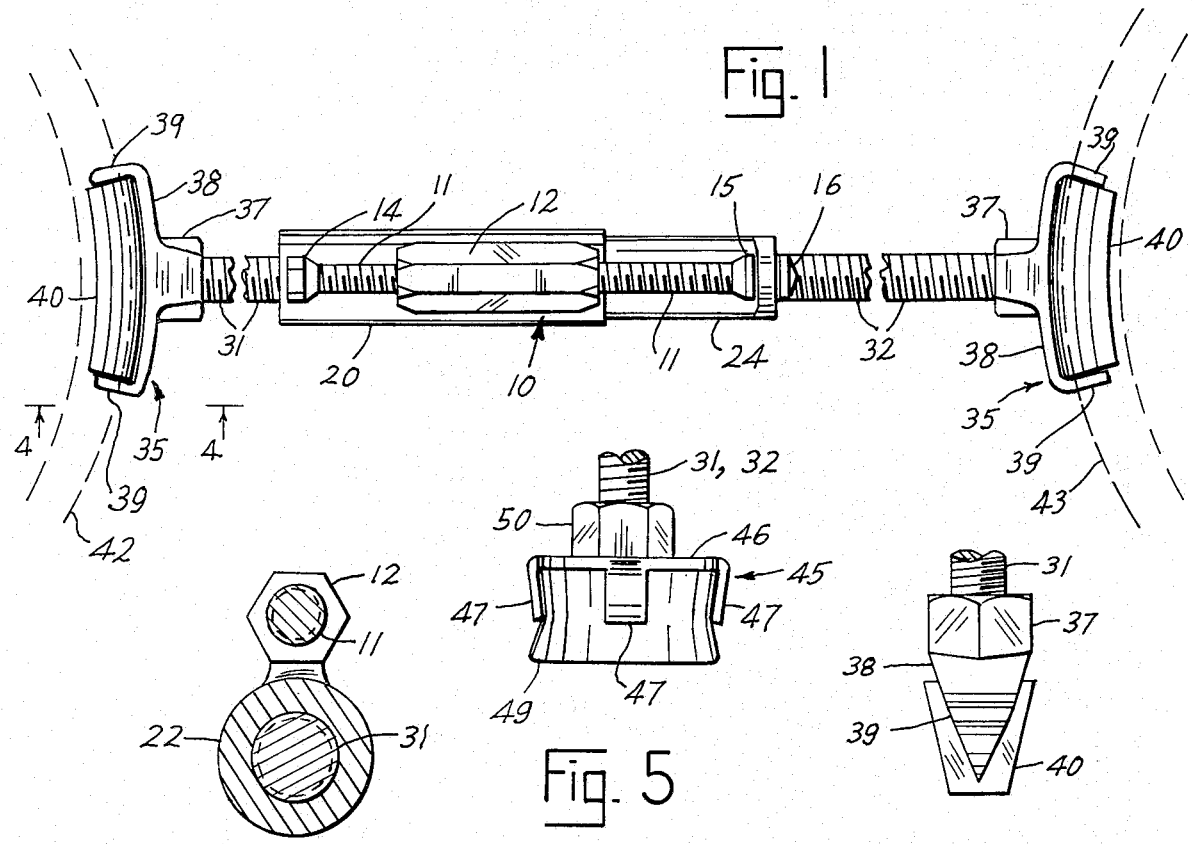
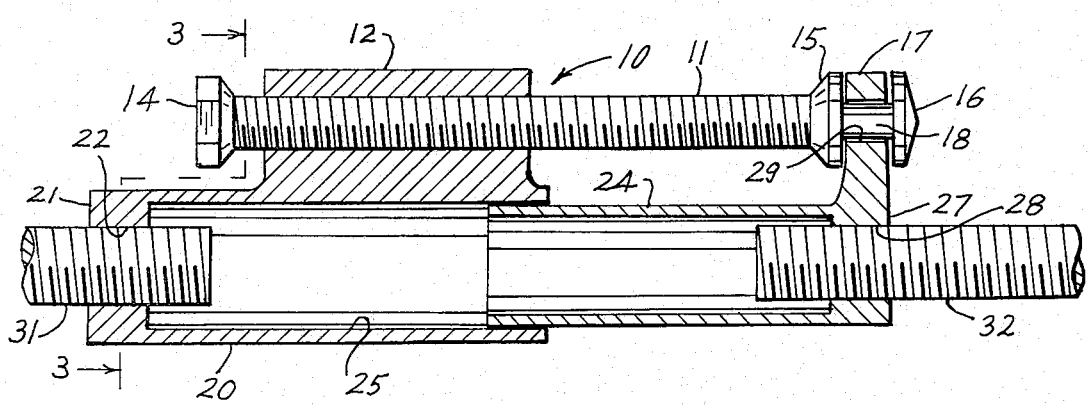

APPARATUS FOR TIGHTENING BELTS

SUMMARY OF THE INVENTION

Tightening of belts of automotive vehicles and of other machines and apparatus is often a problem. The pulleys or sheaves around which the belt is mounted must be forceably spread apart to obtain tightening of the belt, and then secured in position so that the belt will remain tight. This is often accomplished by hand or by use of a bar or other lever in order to obtain the necessary tightness of the belt. In the case of automobiles, particularly, belts are often mounted with improper tension, which causes excessive belt wear and which may cause damage to the bearings of the pulleys or sheaves.

According to the invention, an apparatus is provided through use of which belt tightening can be made a simple operation, and reliable belt tension may be obtained. The apparatus according to the invention includes a jack-screw, or the like, which is used to elongate telescoped elements in order to spread pulleys around which a belt is disposed. The telescoped elements each have a threaded rod secured longitudinally thereof, to the outer ends of which are connected fittings adapted to engage the peripheral belt grooves of sheaves. The apparatus is engaged between the nearest points of the sheaves, and extension of the apparatus does not cause rotation of the sheaves, but instead prevents sheave rotation during belt tightening.

The apparatus may be provided with several lengths of threaded rods in order to adjust the overall length of the apparatus for different sheaves spacings. If the sheaves are farther apart, longer threaded rods are used to meet the sheaves at opposite ends. If the sheaves are closer together, shorter threaded rods are used. The belt tensioning is caused by rotation of the jackscrew to elongate the telescoped elements. This causes force to be applied outwardly between the sheaves to tighten the belt. The jack-screw may be rotated in reverse direction to shorten the apparatus for placement of the apparatus between the sheaves, after which the jackscrew is turned in the elongating direction to perform the tightening. The jackscrew enables ample force to be applied between the sheaves to obtain tightening of substantially any degree.

A principal object of the invention is to provide apparatus for use in tightening belts on sheaves or pulleys. An additional object is to provide such apparatus which is simple yet reliable in use. Still another object of the invention is to provide such apparatus which is economical and which may be readily stored and maintained, and which may be used in substantially any belt location, even in confined areas.

Other objects and advantages of the invention will appear from the following detailed description of preferred embodiments thereof, reference being made to the accompanying drawings.

BRIEF DESCRIPTIONS OF THE DRAWINGS

FIG. 1 is a side elevation of a preferred form of apparatus according to the invention.

FIG. 2 is an axial cross section of the apparatus of FIG. 1.

FIG. 3 is a transverse cross section taken at line 3—3 of FIG. 2.

FIG. 4 is an end elevation of a sheave-engaging fitting of the apparatus of FIG. 1.

FIG. 5 is a side elevation of a modified form of fitting for use with the apparatus.

DESCRIPTIONS OF THE PREFERRED EMBODIMENTS

Referring to the drawings in detail, the preferred embodiment of apparatus shown in FIGS. 1–4 includes a jackscrew assembly 10 including a threaded rod 11 threadedly disposed through coupling nut 12. At one end, rod 11 has an enlarged hexagonal nut formation 14. At its opposite end, rod 11 has enlarged collar stop 15 and an end enlargement 16. The collar 15 and end enlargement 16 are disposed at opposte sides of an upstanding formation 17. Rod 11 is of reduced diameter at 18, between collar 15 and enlargement 16.

Coupling nut 12 is integrally formed or connected to one side of a tubular element 20, which is one of the telescoped elements of the apparatus. Element 20 has a closed end 21 having a tapped opening 22 axially therethrough. A second telescoped element 24 is slidably received within cylindrical opening 25 of element 20. Element 24 has closed end 27 having tapped opening 28 axially therethrough. Upstanding formation 17 is integral with element 24. Element 17 has a smooth hole or passage 29 therethrough, through which portion 18 of rod 11 is rotatably disposed.

Upon rotation of rod 11 by use of hexagonal nut 14, the coupling nut 12 is moved either toward or away from collar 15. This causes movement of element 24 either farther into or farther out of element 20, thereby either retracting or extending the length of the apparatus. Threaded rods 31, 32 are respectively screwed into tapped openings 22, 28. The rods may be screwed into the tapped openings to variable distances, this providing one of the adjustments of the apparatus length. The other, length adjustment is provided by threaded rods 31, 32, each of which may be of any suitable length. An assortment of rods 31, 32 of different lengths may be provided, in order that the apparatus length may readily be adjusted to adapt to different sheave spacings.

A sheave engagement fitting 35 is secured at the outer end of each of the rods 31, 32. Each fitting 35 has a hexagonal nut formation 37 across one side of which is disposed integral curved bar 38 having transversely bent ends 39. Clamped between the ends 39 is an elastomeric element 40, which may be formed by a short length of V-belt. The short length of V-belt 40 is cut to the proper length, and placed between ends 39, which are then bent against the ends of the V-belt to secure it in place. Ends 39 may be pointed to partially penetrate the ends of the V-belt to more securely fasten it in place.

To tighten a belt, the apparatus is disposed between sheaves 42, 43, with elements 40 loosely engaged in the facing grooves of the sheaves. Since the fittings 35 are engaged with the sheaves at the closest points thereof, there is not tendency for the sheaves to rotate. The nut formation 14 is rotated until the sheaves are driven apart sufficiently to tighten the belt disposed therearound. As should by now be apparent, the length of the tool should initially be adjusted by rotation of threaded rods 31, 32 to extend them to different lengths from the central portion of the apparatus, and-/or by interchanging rods 31, 32 of different lengths to provide the proper overall tool length. The outer ends of rods 31, 32 are threadedly engaged in threaded sockets formed by the nut formations 37, so that the elements 35 may readily be removed from and secured to the rods.

The elastomeric elements 40 will suitably engage the belt grooves of sheaves of different sizes, and the sheave periphery need not be of the same curvature as bar 38 and element 40. The two sheaves between which the apparatus is engaged may be of different sizes. The elements 35 will engage cylindrical pulleys as well as the V-grooves of V-belt sheaves, and will also non-slidably engage bars, walls and other objects if necessary to obtain the belt-tightening desired.

It should also be pointed out that the threaded rods 31, 32 may be replaced by non-threaded bars or rods in which case smooth-walled sockets for the bar ends would replace the threaded engagements of nut formations 37 and tapped openings 22, 28. Latching means such as spring biased detents, J-slots, or the like, could then be used to connect the bar ends. The rods 31, 32 serve as tool extension means, and any suitable equivalent arrangement may be used.

For general use in tightening belts of automotive vehicles, the overall length of the tool between the outer edges of the opposite elements 40 should be about five inches. Rods 31, 32 should be provided of lengths to accommodate sheave spacings all the way from about 5 inches to about 26 inches. For example, rods 31, 32 may be provided in lengths of 2 inches, 4 inches, 6 inches, 10 inches, and 12 inches. The length of the central portion of the apparatus, i.e. tubular elements 20, 24 may be of a length to accommodate the 5 to 26 inch overall spacing range of the apparatus.

The fittings 35 may be rotated to any sheave planes with regard to the rotational position of jackscrew assembly 10. It will usually be found most convenient to position jackscrew assembly 10 laterally as shown in FIG. 1, in order that ready access to nut formation 14 can be obtained. The apparatus may be used in either direction, i.e., with the nut formation directed in either direction. Nut formation 14 may be rotated using any tool, a socket wrench of screwdriver form perhaps being the most convenient.

Referring now to FIG. 5 of the drawings, there is shown a fitting which may be used to replace either or both of fittings 35 as shown in FIG. 1. Fitting 45 includes a circular disc 46 having a plurality of rectangular prongs 47 disposed therearound, four prongs 47 being indicated. The prongs 47 are bent to engage the sides of a cylindrical plug or disc 49. Hexagonal nut formation 50 is rigidly secured to the upper side of disc 46, for threaded engagement with a rod 31, 32. The apparatus of FIG. 5 is useful for removing dents from fenders or other sheet metal apparatuses. Disc 49 may be formed of metal, hard rubber, plastic, or the like, and provides a pad to engage an object. In using this form of the apparatus, for example to straighten a fender or other sheet metal apparatus, the other end of the tool may be engaged against a support whereby when threaded formation 14 is rotated the apparatus is expanded in length to push out a dent or depression in the sheet metal object.

In tightening belts, the apparatus has been described as being disposed between two sheaves around which a belt is disposed. Sometimes more than two sheaves are provided in a belt system, and the apparatus may be disposed between any two of a plurality of sheaves of such a system. One end of the apparatus may be engaged against any other support, such as a structural member or another sheave in order to obtain the required force to tighten a belt.

As will by now be clear, the invention affords a useful apparatus which may be employed for tightening belts, or for straightening sheet metal structures such as fenders, or which may be used in diverse other manners which will be clear to those skilled in the art.

While preferred embodiments of the invention have been described and shown in the drawings, many modifications thereof may be made by a person skilled in the art without departing from the spirit of the invention, and it is intended to protect by Letters Patent all forms of the invention falling with the scope of the following claims.

I claim:

1. Apparatus for applying force between spaced sheaves, comprising first and second telescopingly engaged tubular members each having laterally extending means, relative sliding movement of said first and second tubular members increasing or decreasing the combined length thereof, jack means connected between said laterally extending means of said first and second tubular members for controlling said relative sliding movement thereof, each of said tubular members having engagement means at its outer end for engaging one of said spaced sheaves, one of said laterally extending means comprising an interiorly threaded body having a threaded rod engaged therethrough, the other of said laterally extending means including an opening through which said threaded rod is rotatively disposed, said rod means having collar means therearound at opposite sides of said opening to prevent axial motion of said threaded rod means with respect to said opening; each of said engagement means including a tapped opening at the outer end of the tubular member, a threaded rod removably screwed into the tapped opening of each said tubular member, and an engagement element screwed onto the outer end of each said threaded rod having an edge adapted to engage within the peripheral groove of a sheave, each said engagement element comprising a threaded socket, a curved bar disposed crossways behind said socket, a length of V-belt disposed with its outer surface against said curved bar, the ends of said curved bar being outwardly bent to engage the opposite ends of said length of V-belt to clamp said length of V-belt in place against said curved bar.

2. Apparatus for applying force between spaced objects, comprising first and second telescopingly engaged tubular members each having laterally extending means, relative sliding movement of said first and second tubular members increasing or decreasing the combined length thereof, jack means connected between said laterally extending means of said first and second tubular members for controlling said relative sliding movement thereof, each of said tubular members having engagement means at its outer end for engaging one of said spaced objects, one of said laterally extending means comprising an interiorly threaded body having a threaded rod engaged therethrough, the other of said laterally extending means including an opening through which said threaded rod is rotatively disposed, said rod means having collar means therearound at opposite sides of said opening to prevent axial motion of said threaded rod means with respect to said opening; each of said engagement means including a tapped opening at the outer end of the tubular member, and an engagement element screwed onto the outer end of each said threaded rod having an outer surface adapted to engage one of said spaced objects, each said engagement element comprising a threaded socket, a support disposed transversely behind said socket, an elastomeric element disposed with its inner surface against said support, said support having plural outwardly bent prongs engaging opposite sides of said elastomeric element to clamp said elastomeric element in place against said support.

* * * * *